UNITED STATES PATENT OFFICE.

JAMES P. PURSELL, OF QUINCY, ILLINOIS, ASSIGNOR TO THE FRUITED CEREAL COMPANY, OF QUINCY, ILLINOIS, A CORPORATION OF DELAWARE.

PREPARED HEALTH FOOD AND PROCESS OF MAKING SAME.

1,271,765.   Specification of Letters Patent.   Patented July 9, 1918.

No Drawing.   Application filed December 4, 1917.   Serial No. 205,332.

*To all whom it may concern:*

Be it known that I, JAMES P. PURSELL, a citizen of the United States of America, and a resident of Quincy, county of Adams, and State of Illinois, have invented certain new and useful Improvements in Prepared Health Foods and Processes of Making Same, of which the following is a specification.

The main objects of this invention are to provide an improved process for preparing health food in such manner as to be easily digested and quickly assimilated, and to avoid any treatment of the ingredients which is likely to reduce the efficiency of the natural food elements; and particularly to provide for properly preparing such food from a combination of cereals and fruits.

In practising this process any of the common cereals may be used, but wheat or oats is preferred. The fruits which are preferred are those which are usually shipped in dry form, such as dates, figs, and raisins. All of the cereals and fruits are preferably used without any added ingredients and without removal of any of their natural ingredients excepting that in most cases the seeds of the fruit are removed.

The cereals and fruits may be combined in varied proportions, but it has been found that the best results can be obtained from a combination of one part fruit to from five to nine parts cereal. A desirable fruit combination for this purpose may consist of about ten parts dates to three parts of nearly equal portions of figs and raisins.

The process of treating and combining these ingredients will vary depending upon the kind and condition of cereal used. In general, the process consists in cooking the cereal, adding thereto the fruit previously mixed and ground, whereupon the mixture is in turn cooked, dried, toasted, and ground, preparatory to packing it in cartons. When wheat is used, a preliminary treatment of the wheat is sometimes required, which consists in recleaning, polishing, and washing it for about twenty minutes, after which the water is drawn off. With oats, this preliminary treatment is unnecessary.

More specifically, the process of preparing and combining these ingredients is as follows:

The first principal step is to place a quantity of cereal in the whole grain, say about one hundred pounds, in a retort or steam cooker, to which is added from one to three gallons of water, depending upon the physical condition of the grain. The steam is applied directly to the grain, which is cooked for from one and one-half to three hours, under from five to twenty-five pounds steam pressure.

The second step is to prepare the fruit, which consists in pitting the dates and seeding the raisins (unless seedless raisins are used), which together with the figs, are run through a grinder so that they are mixed and ground into particles about three-sixteenths of an inch in size. The proportions of the fruit are about ten pounds of dates to about three and one-half pounds of raisins and figs in nearly equal proportions. This mixture of fruit is placed in the cooker with the cereal, and the same thoroughly mixed and the cooking allowed to continue for about one-half hour.

The third step is to allow the mixture to cool in the cooker for about one or two hours, after which it is transferred into a receiving tank or bin where it is allowed to cure for from five to twenty-four hours.

The fourth step is to convey the mixture on a perforated screen carrier through drying ovens, after which it is carried in buckets to a suitable receptacle where it is allowed to cool.

In case a rolled or flaked resulting product is desired, the material is next passed through rolls on carriers made of cotton or other fabric, the material being subjected to a pressure of several tons while passing through the rolls. The material is then ready for use, but in some cases it is also toasted after being rolled.

When a granulated resulting material is desired, then instead of using the entire fourth step as before described, the mixture is conveyed on a perforated screen carrier through a drying and toasting oven. It is then cooled and thereafter passed through a grinder whereby it is granulated preferably to about one-sixteenth of an inch in size, when it is ready for use. From the grinder, the mixture is usually conveyed to a rotary packing and weighing machine, where it is packed in cartons ready for the market.

The resulting product is a nearly perfectly balanced food containing proper proportions of phosphates, albuminoids, carbohydrates, and fibrous material to invigorate the brain worker, strengthen the athlete, and provide the necessary body-building tissue for the child.

Although this invention is herein particularly described in its preferred embodiment, it will be understood that the product and the various steps of the process may be modified by omission or alteration of details and substitution of ingredients, without departing from the spirit of the invention as defined by the following claims.

I claim:

1. The improved process of preparing health food, which consists in cooking a whole grain cereal, mixing fruit therewith, and continuing the cooking, drying said mixture, and then toasting said mixture.

2. The improved process of preparing health food, which consists in cooking a whole grain cereal by direct application thereto of steam under pressure, mixing therewith a quantity of fruit comprising dates, figs, and raisins, continuing the cooking of the mixture, toasting said mixture, and then grinding the same.

3. The improved process of preparing health food, which consists in cooking a whole grain cereal by direct application thereto of steam under pressure, mixing therewith a quantity of fruit in the proportions of one-tenth to one-sixth of the quantity of cereal, said fruit comprising dates, figs, and raisins, continuing the cooking of the mixture, toasting said mixture, and then grinding the same.

4. The improved process of preparing a health food which consists in cooking a quantity of cereal, drying a quantity of fruit and grinding it, combining the ground particles of fruit with the cereal and cooking the mixture together, then drying the mixture and grinding it.

5. The improved process of preparing health food, which consists in cooking a whole grain cereal by direct application thereto of steam under pressure, mixing therewith a quantity of fruit comprising dates, figs, and raisins, continuing the cooking of the mixture, toasting said mixture, and then rolling the same.

6. The improved process of preparing health food, which consists in cooking a whole grain cereal by direct application thereto of steam under pressure, mixing therewith a quantity of fruit in the proportions of one-tenth to one-sixth of the quantity of cereal, said fruit comprising dates, figs, and raisins, continuing the cooking of the mixture, toasting said mixture, and then rolling the same.

7. The improved process of preparing health food, which consists in cooking a whole grain cereal by direct application thereto of steam under pressure, mixing therewith a quantity of fruit comprising dates, figs, and raisins, continuing the cooking of the mixture, toasting said mixture, and then reducing the same to small particles.

8. The improved process of preparing health food, which consists in cooking a whole grain cereal by direct application thereto of steam under pressure, mixing therewith a quantity of fruit in the proportions of one-tenth to one-sixth of the quantity of cereal, said fruit comprising dates, figs, and raisins, continuing the cooking of the mixture, toasting said mixture, and then reducing to small particles.

Signed at Chicago this 1st day of December 1917.

JAMES P. PURSELL.